(12) United States Patent
Mikami (10) Patent No.: US 11,264,817 B2
(45) Date of Patent: Mar. 1, 2022

(54) HANDY TERMINAL AND HANDY TERMINAL CHARGING SYSTEM CAPABLE OF REDUCING POSSIBILITY OF CONTAMINATING CHARGING TERMINAL BY OPERATOR'S HAND

(71) Applicant: NEC Platforms, Ltd., Kawasaki (JP)

(72) Inventor: Hayato Mikami, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 174 days.

(21) Appl. No.: 16/486,588

(22) PCT Filed: Feb. 16, 2018

(86) PCT No.: PCT/JP2018/005561
§ 371 (c)(1),
(2) Date: Aug. 16, 2019

(87) PCT Pub. No.: WO2018/163760
PCT Pub. Date: Sep. 13, 2018

(65) Prior Publication Data
US 2020/0014225 A1 Jan. 9, 2020

(30) Foreign Application Priority Data
Mar. 6, 2017 (JP) .............................. JP2017-041470

(51) Int. Cl.
*H01M 10/46* (2006.01)
*H02J 7/00* (2006.01)
*G06F 1/16* (2006.01)

(52) U.S. Cl.
CPC .......... *H02J 7/0044* (2013.01); *G06F 1/1692* (2013.01); *H02J 7/0027* (2013.01)

(58) Field of Classification Search
CPC ...... H02J 7/0045; H02J 7/0044; H02J 7/1423; H02J 7/0013; G06F 1/1692; G06F 1/1635; G06F 1/1616
(Continued)

(56) References Cited

U.S. PATENT DOCUMENTS 6,630,811 B1 * 10/2003 Gioscia ................. G06F 1/1635
320/107
9,680,518 B2 * 6/2017 Wojcik .................... H02J 7/007
(Continued)

FOREIGN PATENT DOCUMENTS

JP 10-208780 A 8/1998
JP 2001-169466 A 6/2001
(Continued)

OTHER PUBLICATIONS

Japanese Notice of Allowance for 2017-041470 dated Nov. 28, 2018.
(Continued)

*Primary Examiner* — Edward Tso
(74) *Attorney, Agent, or Firm* — Sughrue Mion, PLLC (57) ABSTRACT

A handy terminal has a housing, a secondary battery embedded in the housing, and a terminal portion including a charging terminal for charging the secondary battery, and is used by gripping the housing with one hand, wherein: the housing is provided with a grip assumed region extending, within a predetermined range, upward from the lower end of the front surface, the back surface, the left-side surface, and the right-side surface in a vertical direction and capable of being touched by one gripping hand of an operator during operation; and the terminal is provided outside the grip assumed region in the right-side surface.

12 Claims, 10 Drawing Sheets

(58) Field of Classification Search
USPC .................................. 320/107, 114, 115, 116
See application file for complete search history.

(56) References Cited

U.S. PATENT DOCUMENTS

| | | |
|---|---|---|
| 2008/0238366 A1 | 10/2008 | Kohata |
| 2014/0198070 A1 | 7/2014 | Won |
| 2016/0026381 A1 | 1/2016 | Kim et al. |
| 2017/0170678 A1* | 6/2017 | Uhm .................. H02J 7/00308 |

FOREIGN PATENT DOCUMENTS

| | | |
|---|---|---|
| JP | 2002-135985 A | 5/2002 |
| JP | 2003-47164 A | 2/2003 |
| JP | 2007-060823 A | 3/2007 |
| JP | 2007-141120 A | 6/2007 |
| JP | 2008-092772 A | 4/2008 |
| JP | 2008-252534 A | 10/2008 |
| JP | 2009-183118 A | 8/2009 |
| JP | 2009-201276 A | 9/2009 |
| JP | 2010-061633 A | 3/2010 |
| JP | 2012-200054 A | 10/2012 |
| JP | 2014-137824 A | 7/2014 |
| JP | 2014-168327 A | 9/2014 |
| JP | 2015-050416 A | 3/2015 |
| JP | 2016-59150 A | 4/2016 |
| JP | 2016-063692 A | 4/2016 |

OTHER PUBLICATIONS

Japanese Office Action for 2018-244475 dated Apr. 5, 2019.
International Search Report for PCT/JP2018/005561 dated, May 15, 2018 (PCT/ISA/210).
Written Opinion of the International Searching Authority for PCT/JP2018/005561 dated, May 15, 2018 (PCT/ISA/237).
Communication dated Aug. 21, 2019 from Japanese Patent Office in counterpart JP Application No. 2018-244475.

* cited by examiner

HANDY TERMINAL AND HANDY TERMINAL CHARGING SYSTEM CAPABLE OF REDUCING POSSIBILITY OF CONTAMINATING CHARGING TERMINAL BY OPERATOR'S HAND

CROSS REFERENCE TO RELATED APPLICATIONS

This application is a National Stage of International Application No. PCT/JP2018/005561 filed Feb. 16, 2018, claiming priority based on Japanese Patent Application No. 2017-041470, filed Mar. 6, 2017, the disclosures of which are incorporated herein in their entirety by reference.

TECHNICAL FIELD

This invention relates to a handy terminal to be used while being gripped with one hand and to a charging system for charging the handy terminal.

BACKGROUND ART

An order entry system which is a sort of a POS (Point Of Sale) system and which is used in a restaurant or the like has a handy terminal (mobile terminal) for a shop staff member to enter an order of a customer.

For example, a handy terminal of the type mentioned above is disclosed in Patent Document 1. The handy terminal disclosed in Patent Document 1 includes a left door-like member having a touch panel display and a right door-like member having a keyboard. The left door-like member is provided with a charging terminal formed on a lower side surface thereof. The touch panel display is provided with a numeric keypad as software buttons formed in an area close to a bottom of the left door-like member. When a shop staff member (operator) enters an order of a customer, he/she grips the left door-like member with one hand in the vicinity of the area where the numeric keypad is formed and performs an operation for order entry with the other hand.

Figure 10:
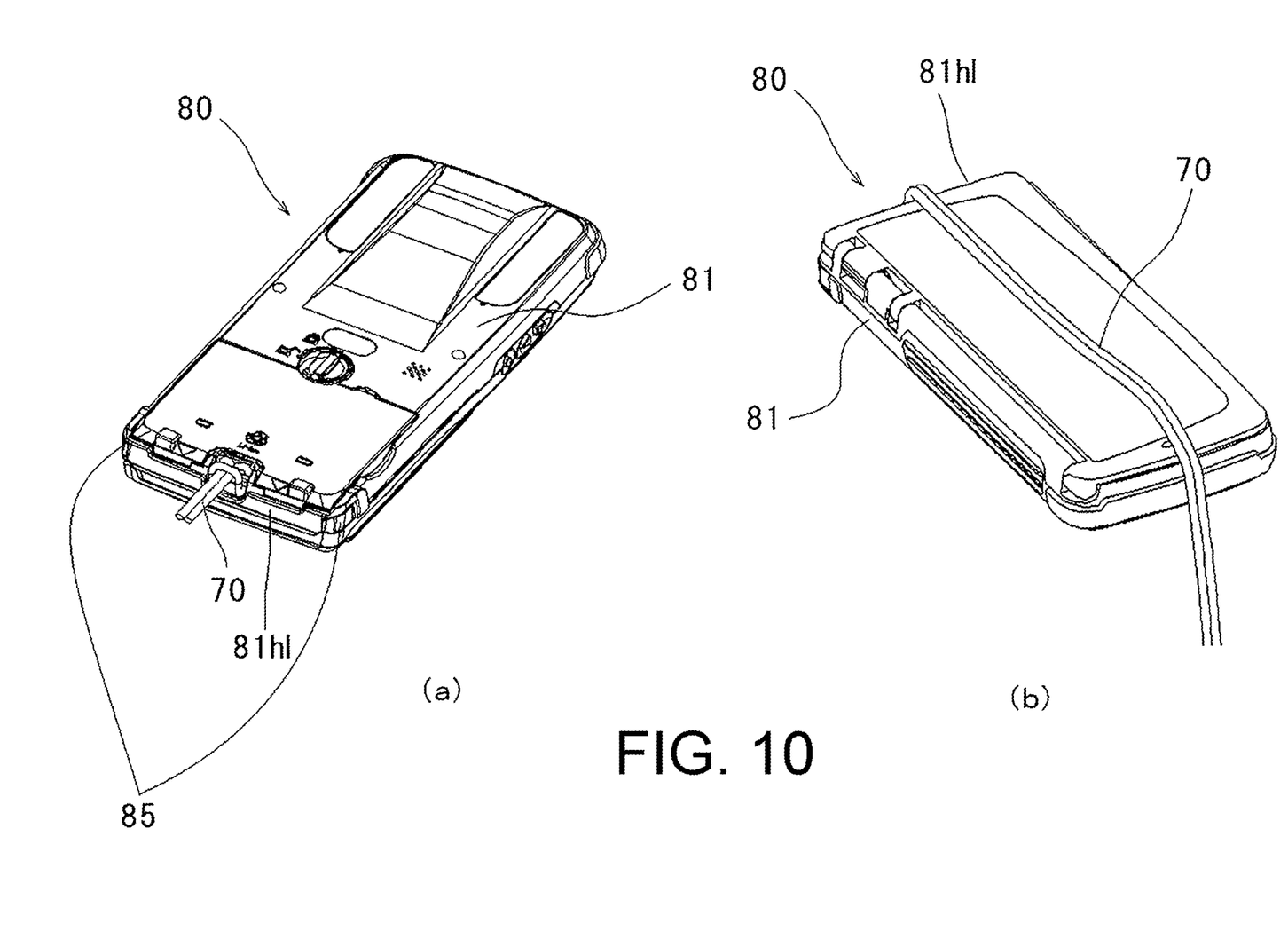
FIG. 10 includes (a) and (b) which are perspective views of a handy terminal of a related art for this invention.

Another example of the handy terminal is illustrated in FIG. 10 at (a) and (b). In the handy terminal 80, a pair of charging terminals 85 are formed at left and right ends of a lower side surface 81hl of a left door-like member 81. In the figure, a reference numeral 70 represents a strap.

PRIOR ART DOCUMENT(S)

Patent Document(S)

Patent Document 1: JP 2007-141120 A

SUMMARY OF THE INVENTION

Problem to be Solved by the Invention

In the handy terminal disclosed in Patent Document 1, the hand of the operator may touch the charging terminal formed at the bottom of the left door-like member during insertion into and removal from a charging stand or during the operation for order entry. As a result, there is a risk that the charging terminal may be contaminated to cause contact failure during charging. On the other hand, in the handy terminal 80 illustrated in FIG. 10 at (a) and (b), the charging terminals 85 are formed at the left and the right ends of the lower side surface 81hl of the left door-like member 81. Therefore, the hand of the operator may touch the charging terminals 85 with higher possibility than that in the handy terminal disclosed in Patent Document 1. This results in a higher risk that the charging terminals 85 may be contaminated to cause contact failure during charging.

It is an object of this invention to provide a technique for solving the above-mentioned problem and to provide a handy terminal capable of reducing the possibility of contaminating a charging terminal by an operator's hand.

It is another object of this invention to provide a handy terminal charging system adapted to charge the above-mentioned handy terminal.

Means to Solve the Problem

According to one aspect of this invention, there is provided a handy terminal comprising a housing having a generally rectangular shape and having a longitudinal direction, a transversal direction, and a thickness direction; a secondary battery embedded in the housing; and a charging terminal formed on the housing and adapted to charge the secondary battery, the handy terminal being used by gripping the housing with one hand, the housing having a lower side surface and an upper side surface opposite to each other in the longitudinal direction; a left side surface and a right side surface opposite to each other in the transversal direction; a front surface and a back surface opposite to each other in the thickness direction; and an assumed grip area which extends, on the left side surface, the right side surface, the front surface, and the back surface, in a predetermined range upward from their lower ends in the longitudinal direction and which is possibly contacted by the one hand as a gripping hand of an operator during operation, the charging terminal being formed outside the assumed grip area on one of the left side surface and the right side surface.

According to another aspect of this invention, there is provided a handy terminal charging system, comprising the handy terminal mentioned above and a charging stand having a stand width direction, a stand depth direction, and a stand height direction and adapted to mount the handy terminal and to charge the secondary battery of the handy terminal, the charging stand having a terminal mounting portion for mounting the handy terminal with the charging terminal faced downward, the terminal mounting portion having a bottom surface portion faced to one of the left side surface and the right side surface of the handy terminal as mounted, that is provided with the charging terminal; a first position limiting wall portion protruding from the bottom surface portion in the stand height direction and defining, in the stand width direction, a position of the handy terminal as mounted; a second position limiting wall portion protruding from the bottom surface portion in the stand height direction and defining, in the stand depth direction, a position of the handy terminal as mounted; and a charging contact pin formed on the bottom surface portion and electrically connected to the charging terminal of the handy terminal as mounted.

Effect of the Invention

The handy terminal according to this invention is capable of reducing the possibility of contaminating the charging terminal by the operator's hand.

MODE FOR EMBODYING THE INVENTION

A handy terminal according to an embodiment of this invention has a housing, a secondary battery, and a charging terminal and is used by gripping the housing with one hand.

The housing has a generally rectangular shape and has a longitudinal direction, a transversal direction, and a thickness direction. The secondary battery is embedded in the housing. The charging terminal is formed on the housing and is adapted to charge the secondary battery.

The housing has lower and upper side surfaces opposite to each other in the longitudinal direction, left and right side surfaces opposite to each other in the transversal direction, front and back surfaces opposite to each other in the thickness direction, and an assumed grip area.

The assumed grip area is an area which extends, on the left and the right side surfaces and the front and the back surfaces, in a predetermined range upward from their longitudinal lower ends and which is possibly contacted by the one hand as a gripping hand of an operator during operation.

The changing terminal is formed outside the assumed grip area on the left side surface or the right side surface.

With the above-mentioned structure, the handy terminal according to this invention prevents the charging terminal from being contacted by the hand of the operator. Therefore, it is possible to reduce the possibility of contaminating the charging terminal by the hand of the operator.

Now, referring to the drawings, description will be made of a more specific embodiment of the handy terminal according to this invention.

First Embodiment

Referring to FIGS. 1 to 4, a handy terminal 10 according to a first embodiment of this invention is used in an order entry system, which is one aspect of a POS (Point Of Sale) system, and serves as a mobile terminal carried by a shop staff member (operator) to enter an order of a customer.

Figure 1:
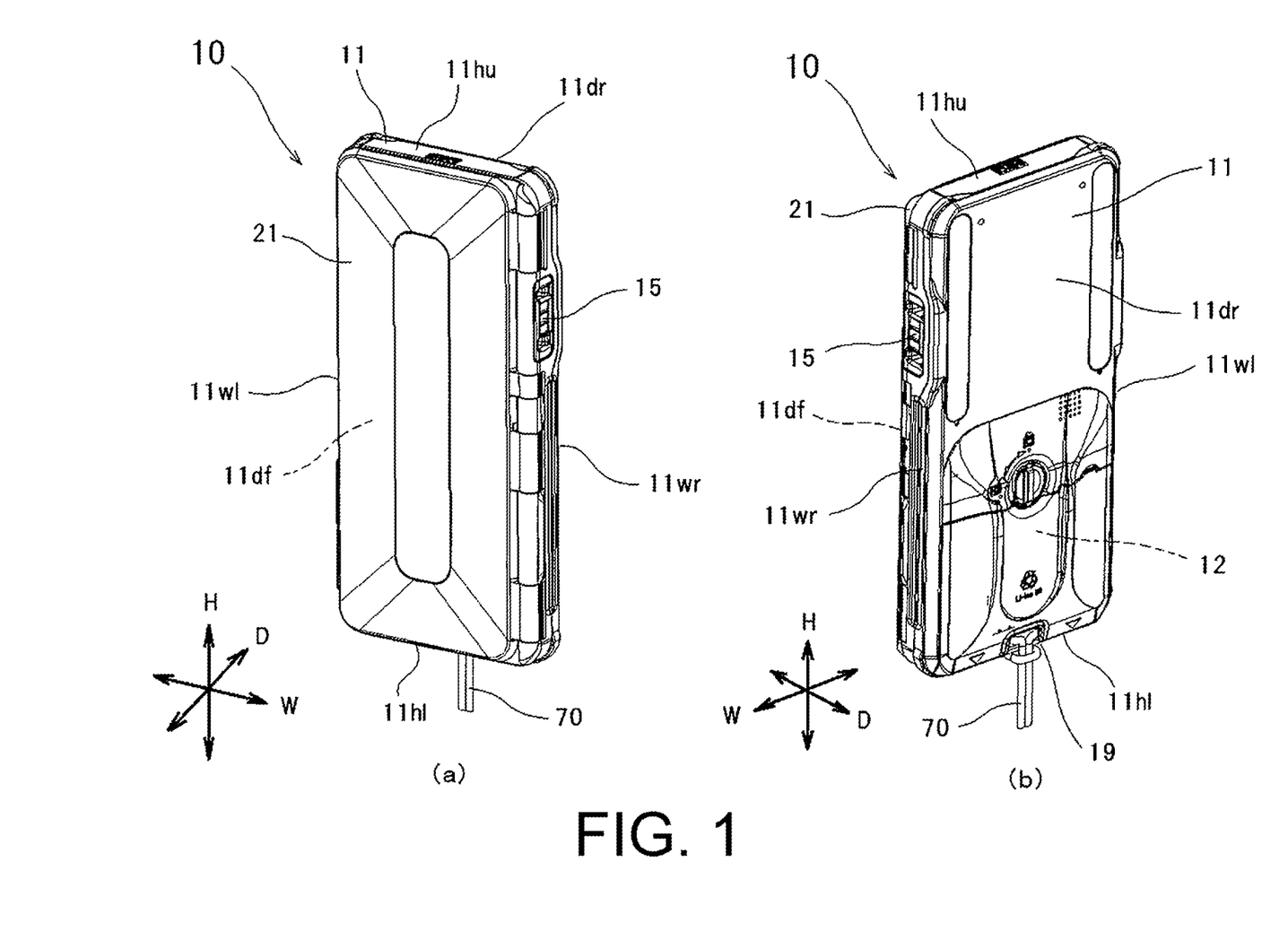
FIG. 1 includes (a) and (b) which are perspective views of a handy terminal according to a first embodiment of this invention.

The handy terminal 10 has a housing 11, a secondary battery 12, and a terminal portion 15 and is used by gripping the housing 11 with one hand.

The housing 11 has a generally rectangular shape and has a longitudinal direction H, a transversal direction W, and a thickness direction D. The secondary battery 12 is embedded in the housing 11.

Figure 2:
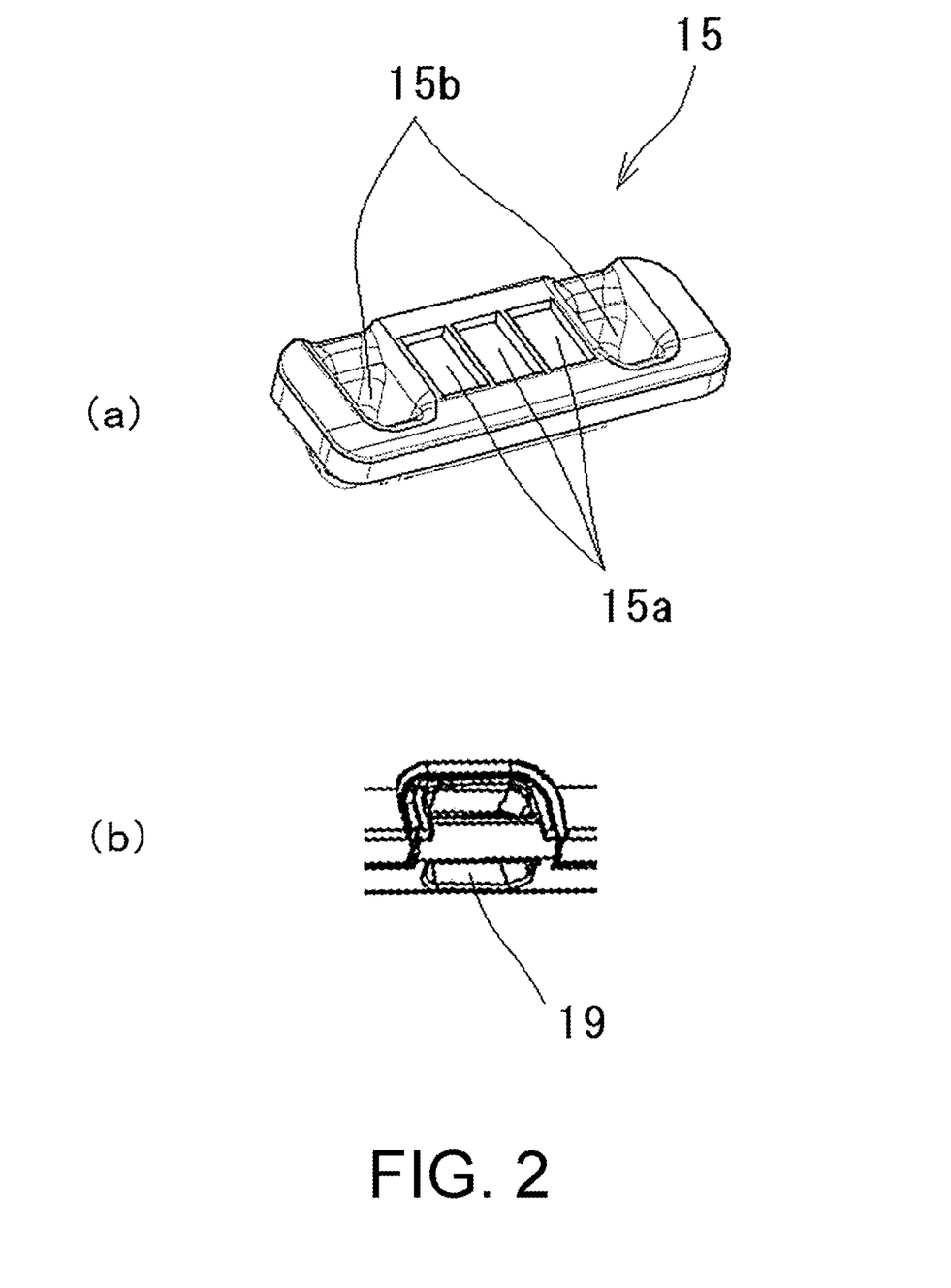
FIG. 2 includes (a) which is a partial perspective view showing a terminal portion of the handy terminal according to the first embodiment of this invention and (b) which is a partial perspective view showing a strap fixing portion.

As shown in FIG. 2 at (a), the terminal portion 15 has three charging terminals 15a of a land-like shape, and guide grooves 15b formed on both sides of the three charging terminals 15a of the land-like shape. The charging terminals 15a are formed on the housing 11 and adapted to charge the secondary battery 12 by a charging stand which will later be described. More in detail, two of the three charging terminals 15a are adapted to supply charging voltages (12V and GND) while one terminal is connected to GND of the handy terminal 10 inside the handy terminal 10 and is used to detect that the handy terminal 10 is mounted on the charging stand which will later be described.

The housing 11 has a lower side surface 11hl and an upper side surface 11hu opposite to each other in the longitudinal direction H, a left side surface 11wl and a right side surface 11wr opposite to each other in the transversal direction W, a front surface 11df and a back surface 11dr opposite to each other in the thickness direction D, and an assumed grip area PH.

The assumed grip area PH is an area which extends, on the left side surface 11wl, the right side surface 11wr, the front surface 11df, and the back surface 11dr, in a predetermined range upward from their lower ends in the longitudinal direction H and which is possibly contacted by the one hand as a gripping hand of the operator during operation. In this embodiment, the predetermined range (predetermined dimension) is determined taking into account an average width of a palm of an adult, in particular, a width from a second finger (index finger) to a fifth finger (little finger).

The terminal portion 15 including the charging terminals 15a is formed outside the assumed grip area PH on the right side surface 11wr.

The handy terminal 10 has, as a user interface, a fixed key portion 13, a touch panel display 14, and a LED (Light Emitting Diode) 17 for notifying a charging state. The fixed key portion 13 is composed of hardware buttons provided with electrical contacts or piezoelectric elements and is formed on the front surface 11df of the housing 11 inside the assumed grip area PH. The fixed key portion 13 at least includes a numeric keypad. The fixed key portion 13 may be software buttons using a touch panel display. It is noted here that a fixed key is a key whose key display is unchanged from a start of operation to an end of operation. The touch panel display 14 can display software buttons and is formed on the front surface 11df of the housing 11.

Figure 4:
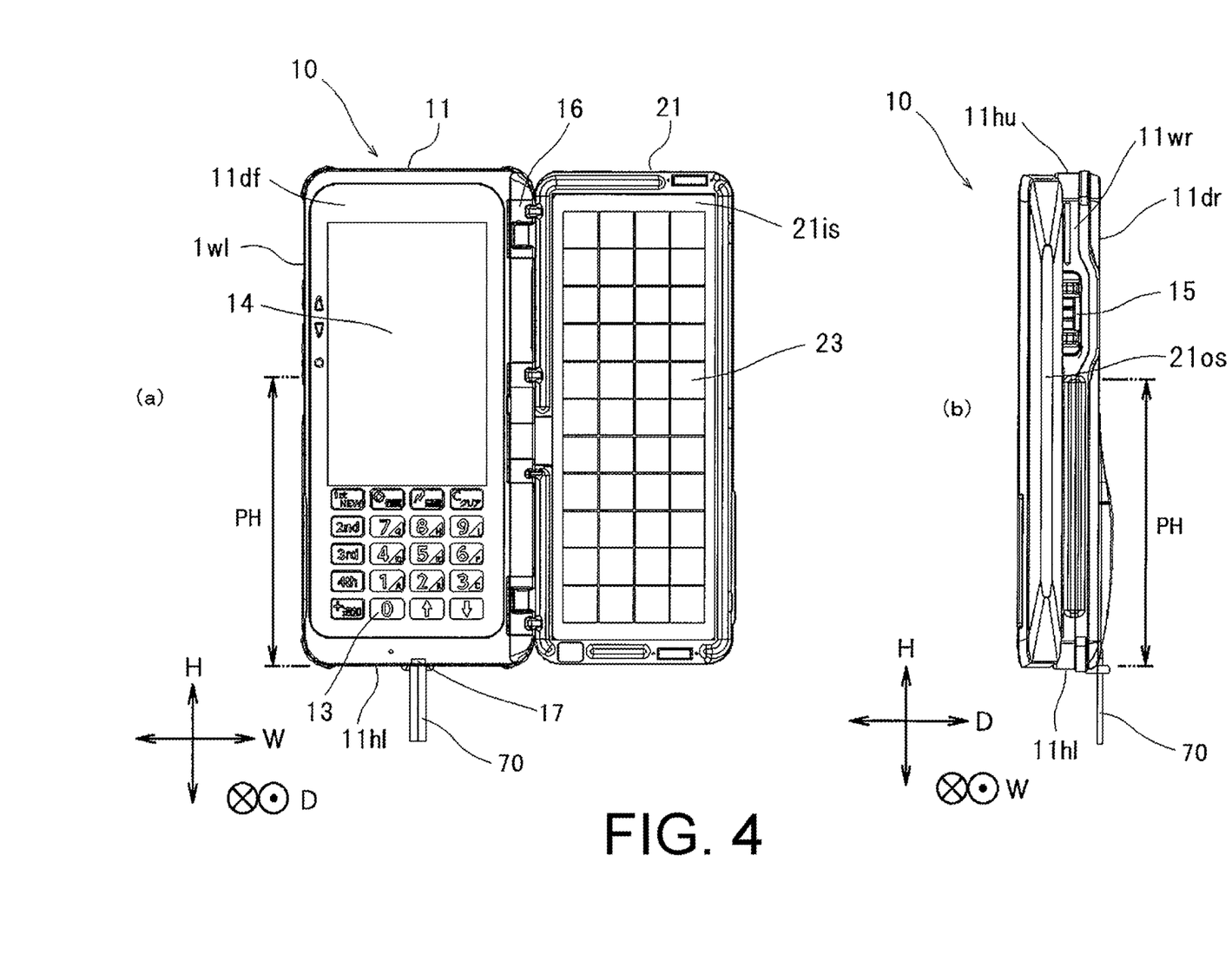
FIG. 4 includes (a) which is a front view of the handy terminal according to the first embodiment of this invention and (b) which is a right side view of the handy terminal.

The handy terminal 10 further has a cover portion 21. The cover portion 21 has a plate-like shape and is connected to the right side surface 11wr through a hinge portion 16 to be rotatable around a center axis extending in the longitudinal direction H. The cover portion 21 has an inner surface 21is and an outer surface 21os. The cover portion 21 has a rotatable range between a fully closed state in which the inner surface 21is overlaps the front surface 11df of the housing 11 and a fully opened state in which the cover portion is opened by 170 degrees. In FIG. 4 at (a) and (b), illustrated is the state where the cover portion 21 is fully opened by an angle of 170 degrees.

As shown in FIG. 4 at (a), the inner surface 21is of the cover portion 21 is provided with a keyboard portion 23 to be used upon entry of an order of a customer. As the keyboard portion 23, a membrane switch is used but a touch panel may be used. On the keyboard portion 23, a transparent plastic plate with a grid-like pattern printed thereon is attached (not illustrated in FIG. 3). Between the keyboard portion 23 and the transparent plastic plate with the grid-like pattern printed thereon, a paper with a menu or the like printed thereon in conformity with the grid-like pattern can be inserted.

Figure 3:
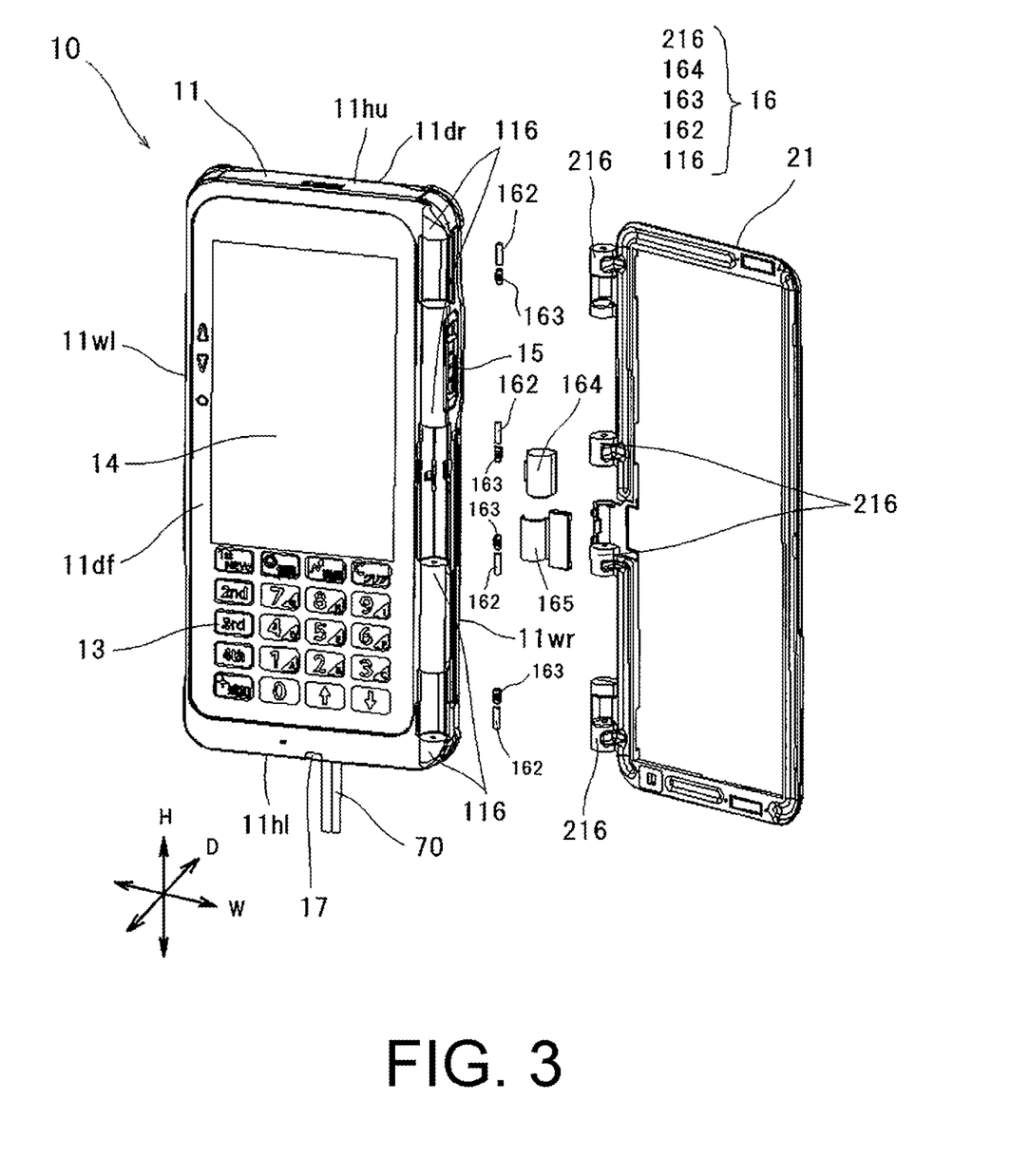
FIG. 3 is a perspective view of the handy terminal according to the first embodiment of this invention in a state where a cover portion is removed therefrom.

Although not illustrated in FIG. 3, the keyboard portion 23 of the cover portion 21 is electrically connected via a flat cable to a control portion of the handy terminal that is embedded in the housing 11 and that is not illustrated in the figure.

As shown in FIG. 3, the hinge portion 16 has a hinge segment 116 formed on the housing 11 and having a hole extending in the longitudinal direction H, a hinge segment 216 formed on the cover portion 21 and having a hole extending in the longitudinal direction H, a shaft 162 inserted through the hole of the hinge segment 116 and the hole of the hinge segment 216, a shaft holder 163 press-fitted into the hole of the hinge segment 216 so as to prevent the shaft 162 inserted through both of the holes from being released, a hinge concealer 164 for improving an external appearance, and a connection cable cover 165 covering the above-mentioned flat cable not illustrated in the figure.

In the handy terminal 10, the terminal portion 15 including the charging terminals 15a are formed on one of the left side surface 11wl and the right side surface 11wr that is connected to the cover portion 21, i.e., on the right side surface 11wr. As is obvious from FIG. 4 at (b), a part of the terminal portion 15 is concealed by the cover portion 21 when the cover portion 21 is opened. Accordingly, the hand of the shop staff member cannot possibly touch the charging terminals 15a during operation of the handy terminal 10.

The housing 11 has a strap fixing portion 19 formed on the lower side surface 11hl and adapted to fix a strap 70. The strap fixing portion 19 is formed at the center of the lower side surface 11hl in the transversal direction W.

Figure 5:
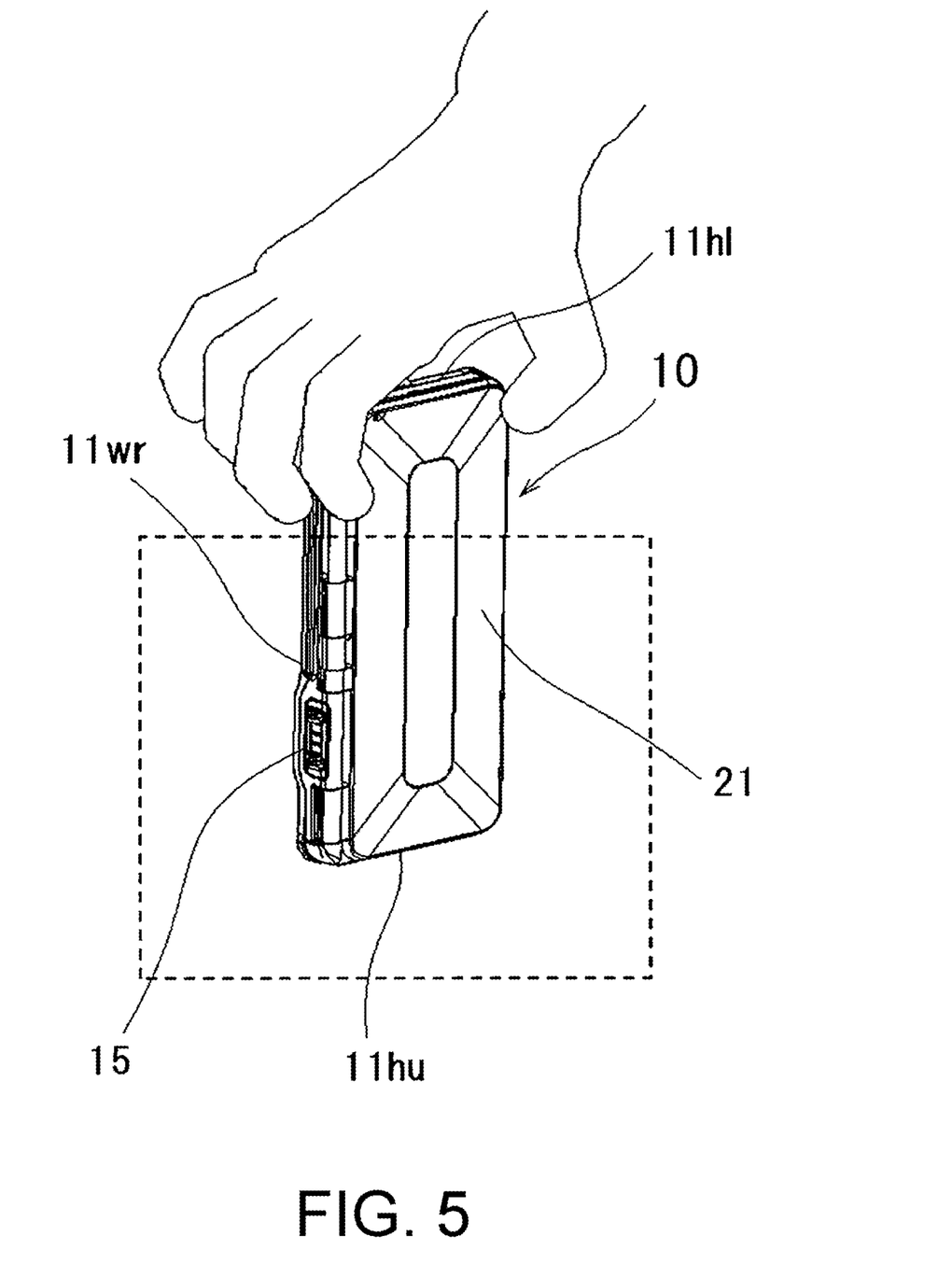
FIG. 5 is a view for describing an operation of taking out the handy terminal according to the first embodiment of this invention from a pocket of pants or an apron.
Figure 6:
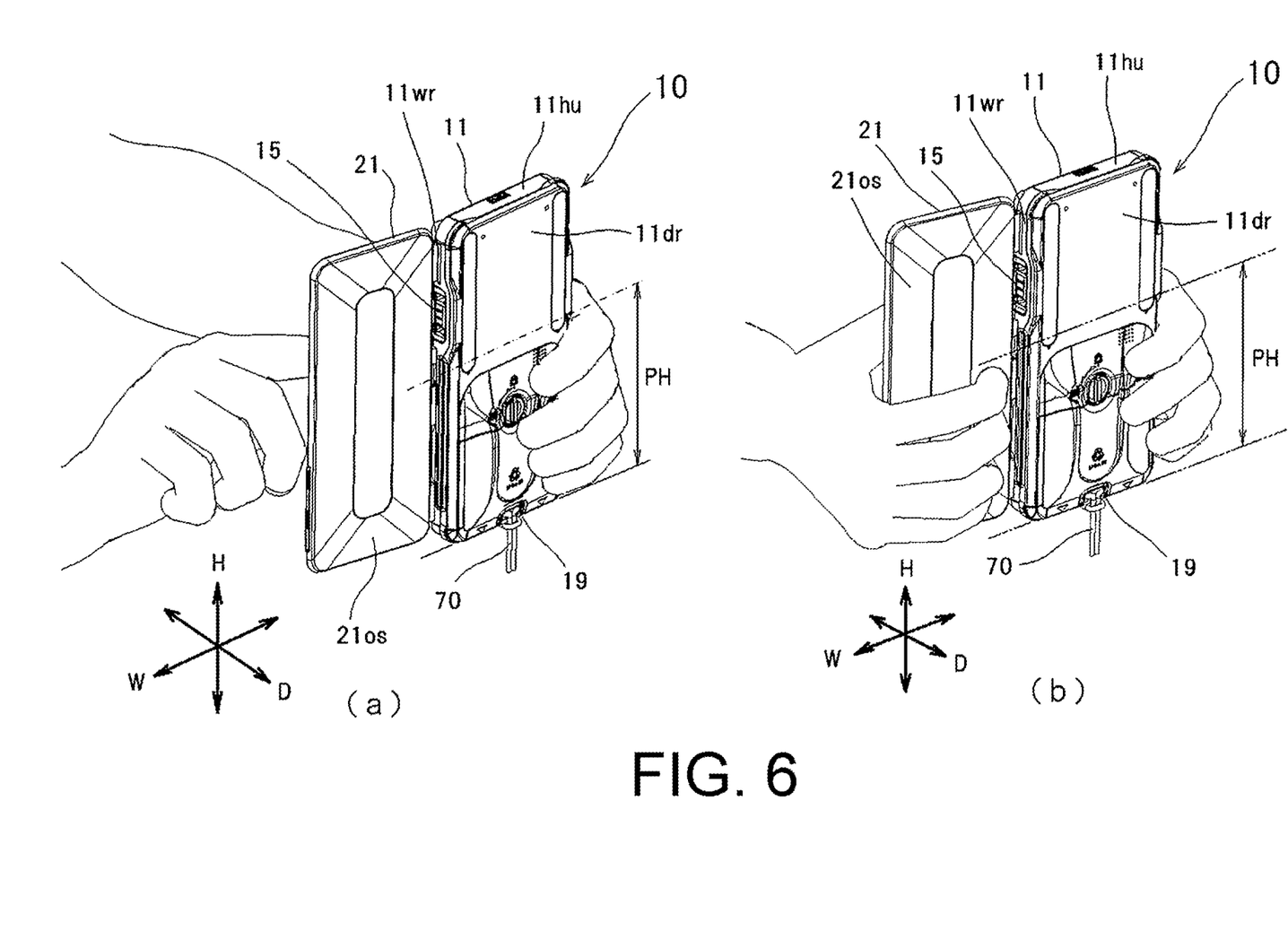
FIG. 6 includes (a) and (b) which are views for describing a state of use of the handy terminal according to the first embodiment of this invention.

FIG. 5 is a view of the handy terminal 10 when it is taken out from a receptacle portion depicted by a dotted line in the figure. For example, the receptacle portion may be a pocket of pants or an apron of the shop staff member. In FIG. 6, (a) is a view in which the housing 11 of the handy terminal 10 is gripped by one hand during operation. In FIG. 6, (b) is a view in which the housing 11 of the handy terminal 10 is gripped by one hand and the cover portion 21 is also gripped by the other hand during operation. In FIG. 6, (a) is a view of a main gripping state during operation. In FIG. 6, (b) is a view of a temporary gripping state during operation when the handy terminal is gripped by the both hands.

Because of the above-mentioned size, the handy terminal 10 cannot be received in a breast pocket of a coat but is received in a pocket of an apron or a back pocket of pants of the shop staff member. In a received state, the handy terminal is received in a direction (upside down) depicted in FIG. 5 so that an operation of order entry can be performed immediately. The dotted line represents the receptacle portion such as a pocket. As shown in FIG. 5, the handy terminal 10 is taken out from the receptacle portion. Since the terminal portion 15 is formed on the right side surface 11wr in an upper part (a lower part in the figure) including the upper side surface 11hu, the hand of the shop staff member cannot possibly touch the charging terminals 15a. Also in case where the handy terminal 10 is taken out from the receptacle portion by holding the strap 70, the strap 70 is held by one hand and pulled up and a side near to a bottom part (an upper part in the figure) including the lower side surface 11hl is gripped by the other hand so that the operation of order entry can immediately be performed. Therefore, the hand of the shop staff member cannot possibly touch the charging terminals 15a.

In the assumed grip area PH, the fixed key portion 13 at least including the numeric keypad is formed. The fixed key portion 13 includes keys which are used with high frequency upon entry of an order of a customer. Therefore, immediately before operation or during operation, the shop staff member grips the assumed grip area PH of the housing 11 with one hand so as to support a rear side of the fixed key portion 13.

At this time, the terminal portion 15 is formed outside the assumed grip area PH on the right side surface 11wr, not on the left side surface 11wl gripped with one hand, the hand of the shop staff member that grips the handy terminal 10 cannot possibly touch the terminal portion 15 (charging terminals 15a). Furthermore, as shown in FIG. 6 at (a) and (b), the cover portion 21 is opened by 170 degrees during operation and the cover portion 21 is faced to the terminal portion 15 so that a part of the terminal portion 15 is concealed by the cover portion 21. Therefore, the other hand of the shop staff member that is not the hand gripping the handy terminal 10 cannot possibly touch the terminal portion 15 (charging terminals 15a).

With the handy terminal 10 according to the first embodiment, it is possible to reduce the possibility of contaminating the charging terminals 15a by the hand of the operator. Furthermore, when the handy terminal 10 is mounted on the charging stand which will later be described, it is not necessary to perform an additional operation related to the strap 70. For the latter, description will be made in a second embodiment.

Second Embodiment

Now, as the second embodiment of this invention, description will be made of a handy terminal charging system for charging the secondary battery 12 of the handy terminal 10 according to the first embodiment.

Figure 7:
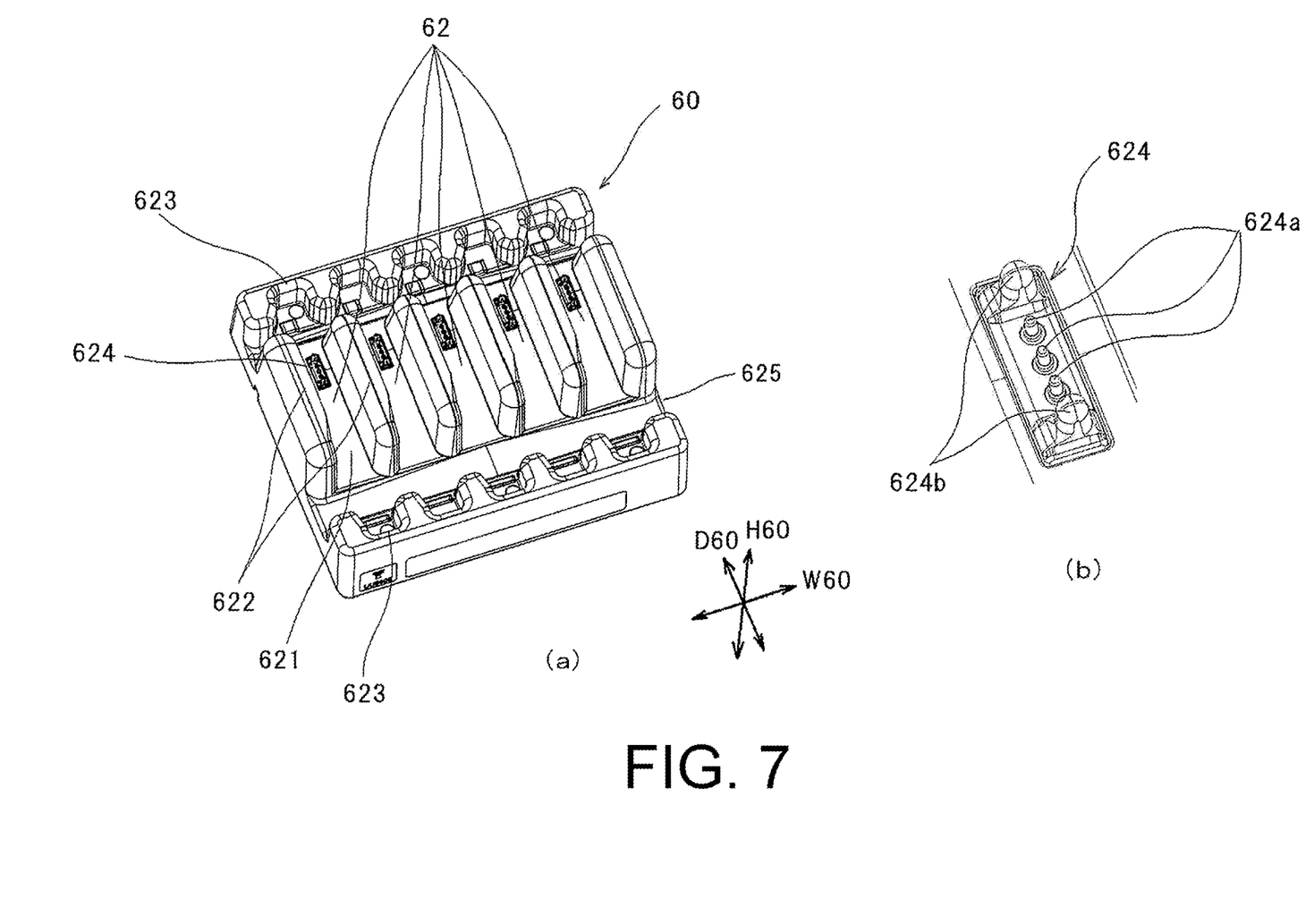
FIG. 7 includes (a) which is a perspective view of a charging stand in a handy terminal charging system according to a second embodiment of this invention and (b) which is a perspective view of a terminal portion of the charging stand.
Figure 8:
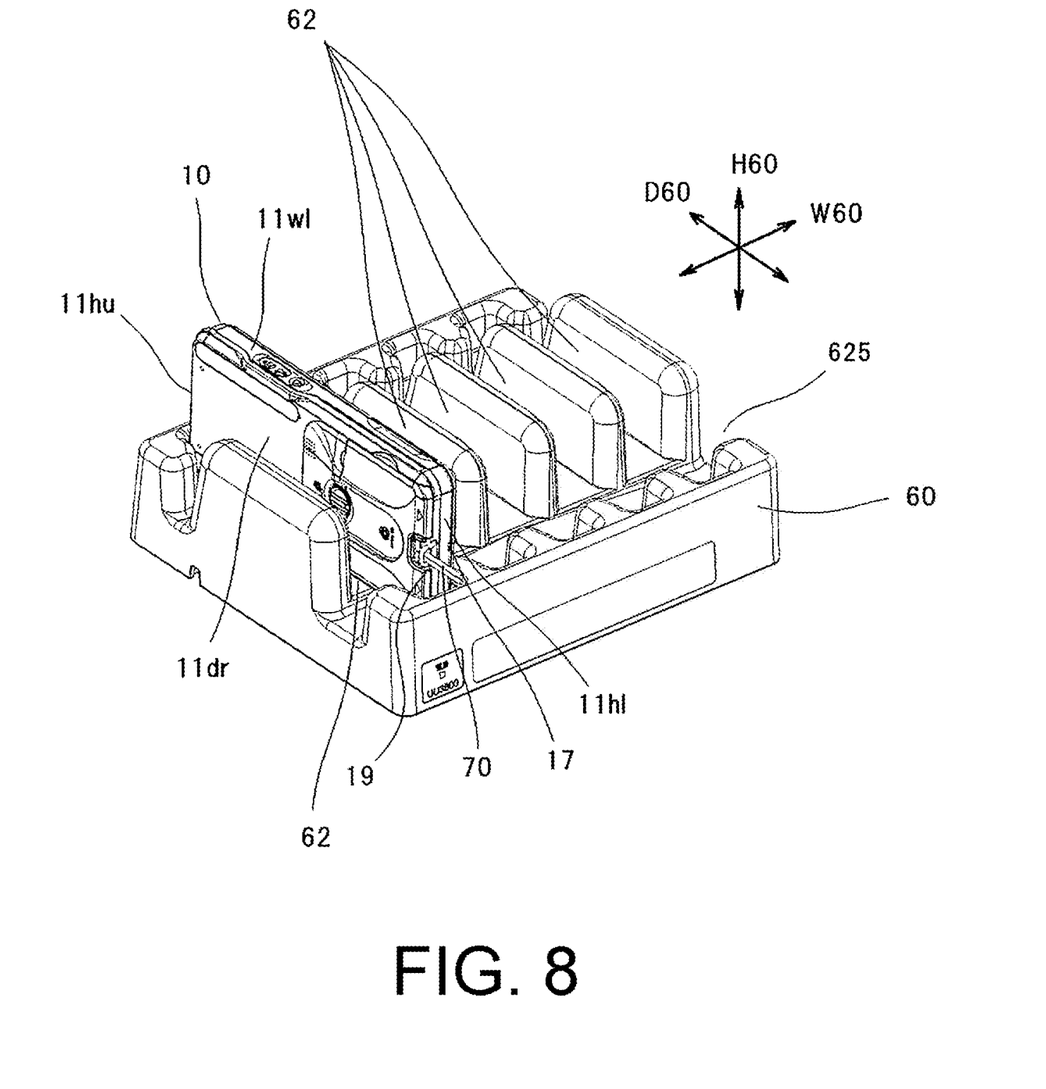
FIG. 8 is a perspective view of the handy terminal charging system according to the second embodiment of this invention.

Referring to (a) and (b) in FIG. 7 and FIG. 8 in addition, the handy terminal charging system according to this embodiment has the handy terminal 10 and a charging stand 60.

The charging stand 60 has a stand width direction W60, a stand depth direction D60, and a stand height direction H60 and is adapted to charge the secondary battery 12 (FIG. 1 at (b)) of the handy terminal 10.

The charging stand 60 has an AC adapter and a charging circuit (each of which is not shown) embedded therein and is able to simultaneously charge five handy terminals 10 at maximum, as shown in FIG. 7 at (a). The charging stand 60 may be configured to simultaneously charge the handy terminals 10, one or more and less than five in number, or to simultaneously charge six or more handy terminals. In FIG. 7 at (a) and FIG. 8, an AC cable is not illustrated.

The charging stand 60 has a terminal mounting portion 62 for mounting the handy terminal 10 with the terminal portion 15 (charging terminals 15a) faced downward. In this embodiment, the charging stand 60 has five terminal mounting portions 62 arranged in parallel in the stand width direction W60.

Each of the terminal mounting portions 62 has a bottom surface portion 621, a first position limiting wall portion 622, a second position limiting wall portion 623, and a contact portion 624.

The bottom surface portion 621 faces one of the left side surface 11wl and the right side surface 11wr (in this embodiment, the right side surface 11wr) of the handy terminal 10 as mounted, that is provided with the terminal portion 15 (charging terminals 15a). The first position limiting wall portion 622 protrudes from the bottom surface portion 621 in the stand height direction H60 and defines, in the stand width direction W60, a position of the handy terminal 10 as mounted. The second position limiting wall portion 623 protrudes from the bottom surface portion 621 in the stand height direction H60 and defines, in the stand depth direction D60, a position of the handy terminal 10 as mounted.

The first position limiting wall portion 622 faced to the front surface 11df or the back surface 11dr of the handy terminal 10 as mounted is provided with a cutout portion 625 formed at a position corresponding to the assumed grip area PH of the handy terminal 10. The cutout portion 625 is a configuration such that, when the handy terminal 10 mounted on the charging stand 60 is taken out, the operator is prompted to hold the assumed grip area PH and, conversely, not to hold the vicinity of the terminal portion 15 (charging terminals 15a).

The second position limiting wall portion 623 adjacent to the strap fixing portion 19 of the handy terminal 10 as mounted is lower in height than the position of the strap fixing portion 19 in the stand height direction H60.

The contact portion 624 is formed on the bottom surface portion 621 and, as shown in FIG. 7 at (b), has three charging contact pins 624a electrically connected to the three charging terminals 15a of the handy terminal 10 as mounted, and guide protruding portions 624b formed on opposite sides of the three charging contact pins 624a and adapted to be inserted into the guide grooves 15b of the handy terminal 10 as mounted.

If the terminal portion 15 (charging terminals 15a) of the handy terminal 10 is formed on the lower side surface 11hl or the upper side surface 11hu of the housing 11, the strap 70 must be positioned when the handy terminal is mounted on the charging stand 60, like the handy terminal 80 of the related art shown in FIG. 10 at (b). Alternatively, the handy terminal must be mounted while the strap 70 is held by hand, and so on. On the other hand, in the handy terminal 10 according to this invention, the terminal portion 15 is formed outside the assumed grip area PH on the right side surface 11wr. Therefore, when the handy terminal 10 is mounted, it is only necessary to be careful so that the strap 70 formed on the lower side surface 11hl does not enter the terminal mounting portion 62 of the charging stand 60. For example, the handy terminal 10 is turned on its side and, without touching the strap 70, mounted on the charging stand 60 from front to back in the stand depth direction D60. As a consequence, the strap 70 hangs down to the outside of the charging stand, as shown in FIG. 8. When the handy terminal is mounted on the charging stand, an operation such as positioning the strap 70 or holding the strap by hand is unnecessary. The strap 70 may be formed on the upper side surface 11hu of the housing 11 of the handy terminal 10. In this case, the handy terminal 10 is turned on its side and, without touching the strap 70, mounted on the charging stand 60 from front to back in the stand depth direction D60.

Third Embodiment

A handy terminal according to a third embodiment of this invention is different from the handy terminal in the first embodiment in that no cover portion is provided. Accordingly, for portions same as or similar to those in the first embodiment, illustration and detailed description will be omitted by incorporating the drawings and the description of the first embodiment.

Figure 9:
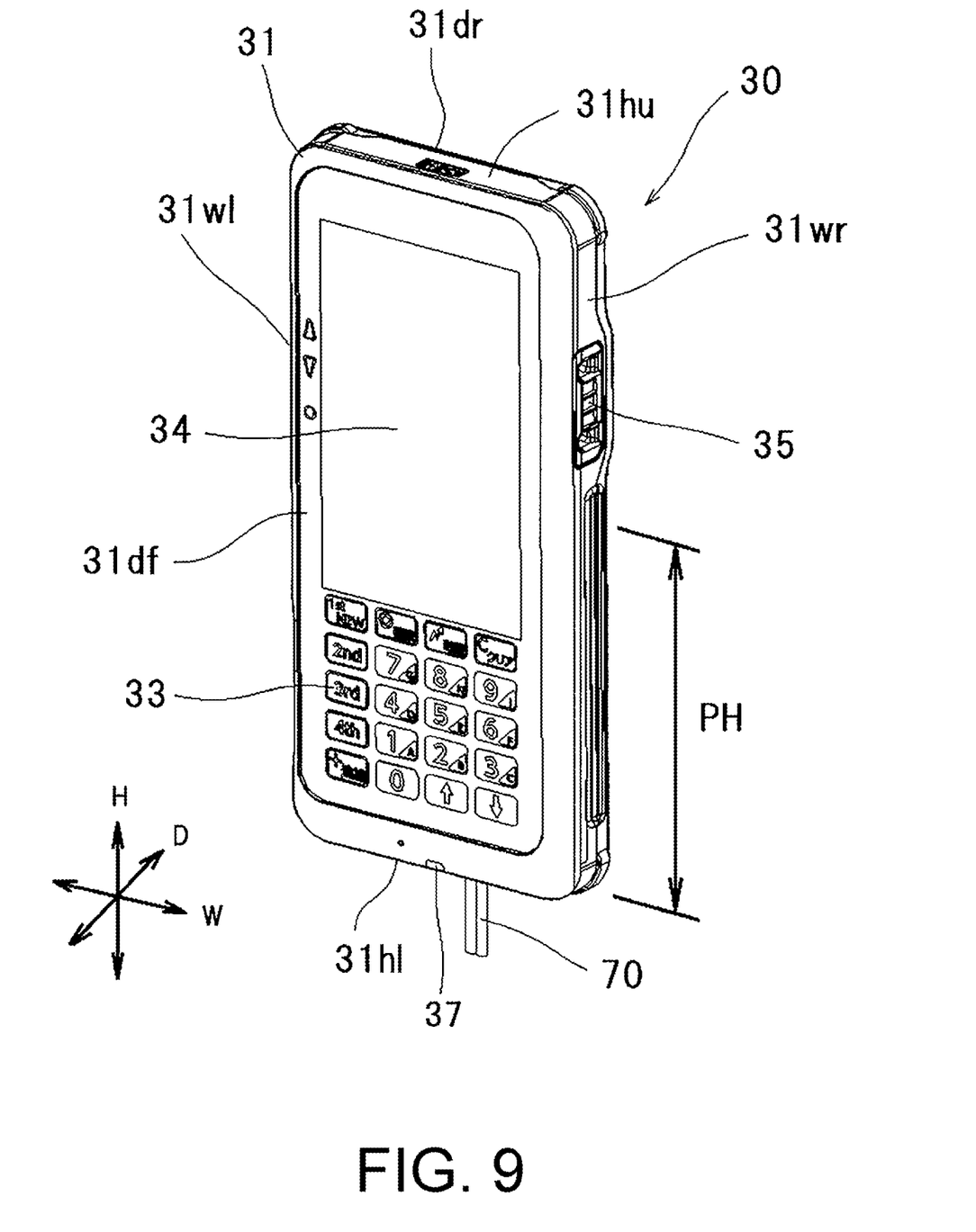
FIG. 9 is a perspective view of a handy terminal according to a third embodiment of this invention.

Referring to FIG. 9, the handy terminal 30 according to the third embodiment of this invention does not have a cover portion. Except that no cover portion is provided, the handy terminal is similar to the handy terminal 10 of the first embodiment in other respects.

Specifically, the handy terminal 30 has a housing 31, a secondary battery not illustrated in the figure, and a terminal portion 35 and is used by gripping the housing 31 with one hand. The housing 31 has a generally rectangular shape and has a longitudinal direction H, a transversal direction W, and a thickness direction D. The secondary battery is embedded in the housing 31. The handy terminal 30 has a fixed key portion 33 at least including a numeric keypad, and a touch panel display 34.

The terminal portion 35 has three land-like charging terminals arranged in parallel, and guide grooves formed on opposite sides of the three land-like charging terminals. The charging terminals are formed on the housing 31 and adapted to charge the secondary battery by a charging stand as described in conjunction with the second embodiment.

The housing 31 has a lower side surface 31hl and an upper side surface 31hu opposite to each other in the longitudinal direction H, a left side surface 31wl and a right side surface 31wr opposite to each other in the transversal direction W, a front surface 31df and a back surface 31dr opposite to each other in the thickness direction D, and an assumed grip area PH.

The assumed grip area PH is an area which extends, on the left side surface 31wl, the right side surface 31wr, the front surface 31df, and the back surface 31dr, in a predetermined range upward from their lower ends in the longitudinal direction H and which is possibly contacted by the one hand as a gripping hand of the operator during operation. In this embodiment also, like the first embodiment, the predetermined range (predetermined dimension) is determined taking into account an average width of a palm of an adult, in particular, a width from a second finger (index finger) to a fifth finger (little finger).

The terminal portion 35 including the charging terminals is formed outside the assumed grip area PH on the right side surface 31wr, not on the left side surface 31wl gripped with one hand.

With the handy terminal 30 according to the third embodiment, it is possible to reduce the possibility of contaminating the charging terminals by the hand of the operator. Furthermore, when the handy terminal 30 is mounted on the charging stand as described in conjunction with the second embodiment, it is unnecessary to perform an additional operation related to the strap 70.

In the first embodiment or the third embodiment described above, the terminal portion including the charging terminals is formed on the right side surface. However, in either embodiment, the terminal portion may be formed on the left side surface.

In the first embodiment or the third embodiment described above, the handy terminal has a strap. However, in either embodiment, no strap may be provided.

EXPLANATION OF REFERENCE SYMBOLS 10, 30 handy terminal
11 housing
11hl, 31hl lower side surface
11hu, 31hu upper side surface 11*wl*, 31*wl* left side surface
11*wr*, 31*wr* right side surface
11*df*, 31*df* front surface
11*dr*, 31*dr* back surface
116 hinge segment
13 fixed key portion
14 touch panel display
15 terminal portion
15*a* charging terminal
15*b* guide groove
16 hinge portion
162 shaft
163 shaft holder
164 hinge concealer
165 connection cable cover
17 LED
19 strap fixing portion
21 cover portion
216 hinge segment
21*is* inner surface
21*os* outer surface
23 keyboard portion
60 charging stand
62 terminal mounting portion
621 bottom surface portion
622 first position limiting wall portion
623 second position limiting wall portion
624 contact portion
624*a* charging contact pin
624*b* guide protruding portion
625 cutout portion
70 strap
PH assumed grip area

The invention claimed is:

1. A handy terminal comprising:
a housing having a generally rectangular shape and having a longitudinal direction, a transversal direction, and a thickness direction;
a secondary battery embedded in the housing; and
a charging terminal formed on the housing and adapted to charge the secondary battery;
the handy terminal being used by gripping the housing with one hand;
the housing having:
   a lower side surface and an upper side surface opposite to each other in the longitudinal direction;
   a left side surface and a right side surface opposite to each other in the transversal direction;
   a front surface and a back surface opposite to each other in the thickness direction; and
   an assumed grip area which extends, on the left side surface, the right side surface, the front surface, and the back surface, in a predetermined range upward from their lower ends in the longitudinal direction and which is possibly contacted by the one hand as a gripping hand of an operator during operation;
the handy terminal further comprising a cover portion having a plate-like shape and connected to the left side surface or the right side surface via a hinge portion to be rotatable around a center axis extending in the longitudinal direction;
wherein the charging terminal is formed outside the assumed grip area on one of the left side surface and the right side surface that is connected to the cover portion, and wherein the housing further has a strap fixing portion formed on the lower side surface or the upper side surface and adapted to fix a strap.

2. The handy terminal according to claim 1, wherein the strap fixing portion is formed in a center area of the lower side surface or the upper side surface in the transversal direction.

3. A handy terminal charging system, comprising:
the handy terminal claimed in claim 1; and
a charging stand having a stand width direction, a stand depth direction, and a stand height direction and adapted to mount the handy terminal and to charge the secondary battery of the handy terminal;
the charging stand having a terminal mounting portion for mounting the handy terminal with the charging terminal faced downward;
the terminal mounting portion having:
   a bottom surface portion faced to one of the left side surface and the right side surface of the handy terminal as mounted, that is provided with the charging terminal;
   first position limiting wall portion protruding from the bottom surface portion in the stand height direction and defining, in the stand width direction, a position of the handy terminal as mounted;
   a second position limiting wall portion protruding from the bottom surface portion in the stand height direction and defining, in the stand depth direction, a position of the handy terminal as mounted; and
   a charging contact pin formed on the bottom surface portion and electrically connected to the charging terminal of the handy terminal as mounted.

4. The handy terminal charging system according to claim 3, wherein one of the first position limiting wall portion and the second position limiting wall portion of the charging stand that is faced to the front surface or the back surface of the handy terminal as mounted is provided with a cutout portion formed at a position corresponding to the assumed grip area of the handy terminal.

5. The handy terminal charging system according to claim 4, wherein the charging stand has a plurality of terminal mounting portions, the terminal mounting portions being arranged in parallel in the stand width direction or the stand depth direction.

6. The handy terminal charging system according to claim 3, wherein the charging stand has a plurality of terminal mounting portions, the terminal mounting portions being arranged in parallel in the stand width direction or the stand depth direction.

7. A handy terminal comprising:
a housing having a generally rectangular shape and having a longitudinal direction, a transversal direction, and a thickness direction;
a secondary battery embedded in the housing; and
a charging terminal formed on the housing and adapted to charge the secondary battery; the handy terminal being used by gripping the housing with one hand; the housing having:
   a lower side surface and an upper side surface opposite to each other in the longitudinal direction;
   a left side surface and a right side surface opposite to each other in the transversal direction;
   a front surface and a back surface opposite to each other in the thickness direction; and
   an assumed grip area which extends, on the left side surface, the right side surface, the front surface, and the back surface, in a predetermined range upward from their lower ends in the longitudinal direction and which is possibly contacted by a gripping one hand of an operator during operation;

the handy terminal further comprising a cover portion having a plate-like shape and connected to the left side surface or the right side surface via a hinge portion to be rotatable around a center axis extending in the longitudinal direction;

wherein the charging terminal is formed outside the assumed grip area on one of the left side surface and the right side surface that is connected to the cover portion, wherein the handy terminal further comprises, within the assumed grip area, a fixed key portion at least including a numeric keypad, and wherein the housing further has a strap fixing portion formed on the lower side surface or the upper side surface and adapted to fix a strap.

8. The handy terminal according to claim 7, wherein the fixed key portion is formed by hardware buttons or software buttons.

9. A handy terminal charging system comprising:

the handy terminal claimed in claim 7; and a charging stand having a stand width direction, a stand depth direction, and a stand height direction and adapted to mount the handy terminal and to charge the secondary battery of the handy terminal;

the charging stand having a terminal mounting portion for mounting the handy terminal with the charging terminal faced downward;

the terminal mounting portion having:

a bottom surface portion faced to one of the left side surface and the right side surface of the handy terminal as mounted, that is provided with the charging terminal;

a first position limiting wall portion protruding from the bottom surface portion in the stand height direction and defining, in the stand width direction, a position of the handy terminal as mounted;

a second position limiting wall portion protruding from the bottom surface portion in the stand height direction and defining, in the stand depth direction, a position of the handy terminal as mounted; and a charging contact pin formed on the bottom surface portion and electrically connected to the charging terminal of the handy terminal as mounted;

at least one of the first position limiting wall portion and the second position limiting wall portion of the charging stand that is adjacent to the strap fixing portion of the handy terminal as mounted is lower in height than a position of the strap fixing portion in the stand height direction.

10. The handy terminal charging system according to claim 9, wherein one of the first position limiting wall portion and the second position limiting wall portion of the charging stand that is faced to the front surface or the back surface of the handy terminal as mounted is provided with a cutout portion formed at a position corresponding to the assumed grip area of the handy terminal.

11. The handy terminal charging system according to claim 9, wherein the charging stand has a plurality of terminal mounting portions, the terminal mounting portions being arranged in parallel in the stand width direction or the stand depth direction.

12. The handy terminal according to claim 7, wherein the strap fixing portion is formed in a center area of the lower side surface or the upper side surface in the transversal direction.

* * * * *